United States Patent
Sidhpuria et al.

(10) Patent No.: US 9,938,658 B2
(45) Date of Patent: *Apr. 10, 2018

(54) FIBER SUITABLE FOR PACKAGING AND STORING PLANT PRODUCE

(71) Applicant: Reliance Industries Limited, Mumbai (IN)

(72) Inventors: Kalpeshkumar Sidhpuria, Gujarat (IN); Prakash Kumar, Gujarat (IN); Gurudatt Krishnamurthy, Karnataka (IN); Shashank Dehade, New Panvel (IN); Sudip Kumar Sarkar, West Bengal (IN); Raksh Vir Jasra, Vadodara-Gujarat (IN)

(73) Assignee: RELIANCE INDUSTRIES LIMITED, Mumbai, Maharashtra (IN)

( * ) Notice: Subject to any disclaimer, the term of this patent is extended or adjusted under 35 U.S.C. 154(b) by 0 days.

This patent is subject to a terminal disclaimer.

(21) Appl. No.: 14/913,533

(22) PCT Filed: Jul. 22, 2014

(86) PCT No.: PCT/IN2014/000484
§ 371 (c)(1),
(2) Date: Feb. 22, 2016

(87) PCT Pub. No.: WO2015/011725
PCT Pub. Date: Jan. 29, 2015

(65) Prior Publication Data
US 2016/0194818 A1 Jul. 7, 2016

(30) Foreign Application Priority Data
Jul. 22, 2013 (IN) .......................... 2431/MUM/2013

(51) Int. Cl.
*D06M 11/00* (2006.01)
*D06M 11/46* (2006.01)
(Continued)

(52) U.S. Cl.
CPC ......... *D06M 11/46* (2013.01); *B01D 53/8668* (2013.01); *B01D 53/885* (2013.01);
(Continued)

(58) Field of Classification Search
CPC .................................................... D06M 11/46
See application file for complete search history.

(56) References Cited

U.S. PATENT DOCUMENTS

| 6,592,858 B1 * | 7/2003 | Honda | A01N 25/34 424/402 |
| 2013/0086753 A1 * | 4/2013 | Kramer | D06M 11/44 8/115.6 |

FOREIGN PATENT DOCUMENTS

| EP | 1188854 | 3/2002 |
| JP | 2006112017 | 4/2006 |
| WO | 2010095148 | 8/2010 |

OTHER PUBLICATIONS

Li et al, Synthesis and Characterization of Nano titania Particles Embedded in Mesoporous Silica with Both High Photocatalytic Activity and Adsorption Capability, 2005, J. Phys. Chem. B, 109, 12309-12315.*

(Continued)

*Primary Examiner* — Melvin C. Mayes
*Assistant Examiner* — Stefanie J Cohen
(74) *Attorney, Agent, or Firm* — Fish IP Law, LLP (57) ABSTRACT

The present disclosure relates to a fiber suitable for packaging. The fiber of the present disclosure comprises a photocatalyst bonded to it by means of a first functional group generated by a surface modifying agent and option- (Continued)

ally, a second functional group generated by a silicon containing linker. The chemical bonding between the fiber and the photocatalyst imparts durability and wash ability to the fiber. A packaging material prepared using the fiber of the present disclosure can be used for the storage of plant produce.

18 Claims, 6 Drawing Sheets (51) Int. Cl.
| | | |
|---|---|---|
| D06M 11/38 | (2006.01) | |
| D06M 11/44 | (2006.01) | |
| D06M 11/45 | (2006.01) | |
| D06M 11/50 | (2006.01) | |
| D06M 11/79 | (2006.01) | |
| D06M 13/503 | (2006.01) | |
| D06M 13/507 | (2006.01) | |
| D06M 23/08 | (2006.01) | |
| B65D 81/26 | (2006.01) | |
| B01D 53/86 | (2006.01) | |
| B01D 53/88 | (2006.01) | |
| B01J 35/00 | (2006.01) | |
| D06M 13/513 | (2006.01) | |
| B01J 21/06 | (2006.01) | |
| B01J 23/06 | (2006.01) | |
| B01J 23/10 | (2006.01) | |
| B01J 23/18 | (2006.01) | |
| B01J 23/745 | (2006.01) | |
| D06M 101/32 | (2006.01) | |

(52) U.S. Cl.
CPC ............. *B01J 21/063* (2013.01); *B01J 23/06* (2013.01); *B01J 23/10* (2013.01); *B01J 23/18* (2013.01); *B01J 23/745* (2013.01); *B01J 35/004* (2013.01); *B65D 81/266* (2013.01); *D06M 11/38* (2013.01); *D06M 11/44* (2013.01); *D06M 11/45* (2013.01); *D06M 11/50* (2013.01); *D06M 11/79* (2013.01); *D06M 13/503* (2013.01); *D06M 13/507* (2013.01); *D06M 13/513* (2013.01); *D06M 23/08* (2013.01); *B01D 2255/20707* (2013.01); *B01D 2255/20792* (2013.01); *B01D 2255/504* (2013.01); *B01D 2255/802* (2013.01); *B01D 2257/7022* (2013.01); *D06M 2101/32* (2013.01); *D06M 2400/01* (2013.01)

(56) References Cited

OTHER PUBLICATIONS

Uchiyama et al, A novel adsorbent photocatalyst consisting of titania and mesoporous silica nanoparticles, 2005, materials and science engineering B 123, pp. 248-251.*
Cong et al, Preparation, Photocatalytic Activity, and Mechanism of Nano-TiO2 Co-Doped with Nitrogen and Iron (III), 2007, j. phys. chem. C, 111, 10618-10623.*
Mahlambi et al, Synthesis and characterization of carbon-covered alumina (CCA) supported TiO2 nanocatalysts with enhanced visible light photodegradation of Rhodamine B, 2011, journal of nanoparticle research, pp. 89-99.*
Saleh et al, Enhancement in photocatalytic activity for acetaldehyde removal by embedding ZnO nano particles on multiwall carbon nanotubes, 2011, chemical engineering journal, 166, pp. 407-412.*
Hashemizad et al, Influence of the Surface Hydrolysis on the Functionality of Poly(ethylene terephthalate) Fabric Treated with Nanotitanium Dioxide, 2012, journal of applied polymer science, vol. 125, pp. 1176-1184.*
Hui et al, Immobilization of TiO2 Nanoparticles on PET Fabric Modified with Silane Coupling Agent by Low Temperature Hydrothermal Method, Jan. 2013, fibers and polymers, vol. 14. No. 1, pp. 43-51.*

* cited by examiner

FIBER SUITABLE FOR PACKAGING AND STORING PLANT PRODUCE

FIELD OF DISCLOSURE

The present disclosure relates to a fiber suitable for packaging and storing plant produce.

BACKGROUND

During the post-harvest storage of plant produce, such as fruits, vegetables and flowers, it is observed that a natural ripening agent (ethylene gas) is released into the surrounding or into the storage containers leading to a change in color, texture, aroma, and nutritional quality of the plant produce. It is also observed that excessive or uncontrolled levels of ethylene gas may result in premature ripening of fruits and vegetables, the fading and wilting of cut flowers, loss of green color, increase in the bitterness of vegetables and the like. Therefore, it is desirable to control the ethylene gas concentration in order to prolong the shelf-life of plant produce. This can be achieved either by reducing the formation of ethylene gas by the plant produce or by reducing the concentration of ethylene gas already formed.

Conventionally, the formation of ethylene gas is reduced either by storing the plant produce in a cold storage at a temperature of −1 to +12° C. and at a relative atmospheric moisture of 80 to 90% or by storing it in a controlled atmosphere at a temperature range of 0 to 5° C. with approximately 3% of oxygen and 0 to 5% of carbon dioxide. However, the above stated storage conditions negatively influence the taste of certain plant produce due to low oxygen content and high carbon dioxide content.

Further, known methods disclose the use of oxidizing agents to convert ethylene gas into carbon dioxide and water. The oxidizing agent includes potassium bromate supported on activated charcoal; silver, alumina, copper and aluminum chloride exchanged zeolite A; palladium chloride supported on carbon; sodium chloride saturated on silica and zeolites; sodium and potassium permanganate impregnated on various carriers like activated carbon, alumina, zeolites and diatomaceous earth. Among these potassium permanganate is observed to be the most effective for converting ethylene into carbon dioxide and water. However, leaching of potassium permanganate at a high humidity of 80 to 90% limits its use.

Packaging containers prepared by using fibers containing silver and copper exchanged hydrophilic zeolites like Zeolite A and X impart good antimicrobial properties but have a limited capacity to remove ethylene.

Therefore, there is a need to envisage a fiber suitable for packaging and capable of reducing the ethylene gas evolved during the ripening process of the stored plant produce.

DEFINITION

The term "fiber" in the context of the present disclosure includes natural or synthetic fibers. The fibers of the present discourse are in the form of discrete fibers, woven fibers, non-woven fibers, yarns, mono filaments, spun filaments, staple filaments, bi-component filaments, multi-component filaments, mono-component yarns, bi-component yarns, multicomponent yarns, fabrics, sheets and mats.

OBJECTS

Some of the objects of the present disclosure are described herein below:

It is an object of the present disclosure to provide a fiber which is suitable for packaging plant produce.

It is another object of the present disclosure to provide a fiber which is capable of adsorbing ethylene gas and converting it into carbon dioxide and water.

It is yet another object of the present disclosure to provide a fiber which is dust proof; antimicrobial and washable.

It is still further object of the present disclosure to provide an economic and simple process for the preparation of a fiber.

Other objects and advantages of the present disclosure will be more apparent from the following description when read in conjunction with the accompanying drawings, which are not intended to limit the scope of the present disclosure.

SUMMARY

In accordance with one aspect of the present disclosure there is provided a fiber suitable for packaging; said fiber comprises a photocatalyst bonded to it by means of a first functional group generated by a surface modifying agent and optionally, a second functional group generated by a silicon containing linker.

The fiber can be natural fiber of plant material selected from the group consisting of cotton, jute and cellulosic material; or the fiber can be synthetic fiber of polymeric material.

Typically, the fiber is polyester fiber.

The photo-catalyst can be at least one selected from the group consisting of titanium iso-propoxide, zinc oxide, metal doped titania and non-metal doped titania.

The metal doped titania can comprise at least one metal selected from the group consisting bismuth, cerium, lanthanum, iron and zinc.

The non-metal doped titania can comprise at least one non-metal selected from the group consisting of nitrogen and sulfur.

The photo-catalyst can be embedded in at least one adsorbent substrate.

The adsorbent substrate can be at least one selected from the group consisting of Ag exchanged ZSM 5 zeolite, zeolite A, alumina and silica.

The particle size of the adsorbent substrate can range between of 0.1 nm and 150 nm.

The surface modifying agent can be at least one selected from the group consisting of lithium hydroxide (LiOH), sodium hydroxide (NaOH), potassium hydroxide (KOH), rubidium hydroxide (RbOH), cesium hydroxide (CsOH), potassium persulphate ($K_2S_2O_8$) and sodium persulphate ($Na_2S_2O_8$).

The bond between the fiber and the photo-catalyst can be at least one bond from the group consisting of covalent, ionic, hydrogen, zwitterions electron-pair, van der waals forces and pi bond interaction.

The silicon containing linker can be at least one selected from the group consisting of tetramethyl ortho silicate, trimethoxy silane, tetraethyl orthosilicate, triethoxy silane, methyl-dimethoxy silane, methyl-diethoxy silane, methyl-trimethoxy silane, cyclohexyl triethoxy silane, methyl-triethoxy silane, methyl-tripropoxy silane, methyl-tributoxysilane, propyl-trimethoxy silane, propyl-triethoxy silane, allyl-triethoxy silane, n-butyl trimethoxy silane, n-butyl triethoxy silane, i-butyl-trimethoxy silane, butyl-triethoxy silane, dodecyl-trimethoxy silane In accordance with another aspect of the present disclosure there is provided a process for preparing a fiber suitable for packaging, said process comprising the following steps:

a. contacting a fiber with at least one surface modifying agent at a temperature of 30° C. to 100° C., for a time period of 15 min. to 5 hrs. followed by washing and drying to obtain a functionalized fiber; and b. refluxing the functionalized fiber with a mixture comprising a photocatalyst, at least one solvent and optionally, a silicon containing linker at a temperature ranging between 40° C. and 90° C., followed by washing, and drying to obtain a fiber suitable for packaging.

Typically, the proportion of silicon containing linker to the photocatalyst is in the range of 1:1 and 300:1

The photo-catalyst can be embedded in adsorbent substrate and said photocatalyst is obtained by a method comprising the following steps:

i. treating at least one adsorbent substrate with a mixture comprising at least one vehicle and at least one photocatalyst under stirring for a time period of 30 min to 5 hrs to obtain slurry; wherein, the proportion of the adsorbent substrate to the mixture is in the range of 5:1 to 50:1 ii. drying the slurry at a temperature of 50° C. to 200° C. for a time period of 30 min to 5 hrs. to obtain an un-hydrolyzed photocatalyst embedded in adsorbent substrate;

iii. hydrolyzing the un-hydrolyzed photocatalyst embedded in adsorbent substrate with water to obtain a hydrolyzed photocatalyst embedded in adsorbent substrate; and iv. drying and calcining the hydrolyzed photocatalyst embedded in adsorbent substrate to obtain a photocatalyst embedded in adsorbent substrate.

The fiber of the present disclosure may be used for preparing a packaging material suitable for storing plant produce.

DETAILED DESCRIPTION

It is well known that the ethylene gas evolved as a result of the biological processes during the storage of plant produce accelerates, the ripening process, and thus shortens the shelf life of the stored plant produce. Accordingly, various attempts have been made in to develop a fiber suitable for packaging and capable of converting ethylene gas into the carbon dioxide and water. However, the packaging prepared using these fibers is not washable, not reusable and ineffective under humid atmosphere. Therefore, with the aim of obviating the problems associated with known methods, the inventors of the present disclosure envisaged a fiber bonded with photocatalyst by means of a first functional group generated by a surface modifying agent and optionally by a second functional group generated by a silicon containing linker. The packaging material prepared by using the fiber of the present disclosure has improved durability and wash ability due to the chemical bonding between the photocatalyst and the fiber.

In accordance with one aspect of the present disclosure there is provided a fiber having a photocatalyst bonded thereto by means of a photocatalyst bonded to it by means of a first functional group generated by a surface modifying agent and optionally, a second functional group generated by a silicon containing linker.

The fiber can be a natural fiber of plant material selected from the group consisting of cotton, jute and cellulosic material; or the fiber can be synthetic fiber of polymeric material.

In accordance with one of the exemplary embodiment of the present disclosure the fiber is polyester fiber.

The photo-catalyst of the present disclosure is bonded to the fiber through at least one functional group generated by the treatment of at least one surface modifying agent and optionally by a silicon containing linker in order to provide durability and wash ability to the packaging material. The bond between the fiber and the photo-catalyst can be at least one bond from the group consisting of covalent, ionic, polar covalent, electrovalent, hydrogen, zwitterion, electron-pair, co-ordinate covalent, van der waals forces, cation pi interaction and ion pi interaction.

The surface modifying agent used in the present disclosure may be selected from the group consisting of lithium hydroxide (LiOH), sodium hydroxide (NaOH), potassium hydroxide (KOH), rubidium hydroxide (RbOH), cesium hydroxide (CsOH), potassium persulphate ($K_2S_2O_8$), sodium persulphate ($Na_2S_2O_8$) and combinations therof.

The silicon containing linker present in the fiber of the of the present disclosure is at least one selected from the group consisting of tetramethyl ortho silicate, trimethoxy silane, tetraethyl orthosilicate, triethoxy silane, methyl-dimethoxy silane, methyl-diethoxy silane, methyl-trimethoxy silane, cyclohexyl triethoxy silane, methyl-triethoxy silane, methyl-tripropoxy silane, methyl-tributoxysilane, propyl-trimethoxy silane, propyl-triethoxy silane, allyl-triethoxy silane, n-butyl trimethoxy silane, n-butyl triethoxy silane, i-butyl-trimethoxy silane, i-butyl-triethoxy silane, dodecyl-trimethoxy silane The photo-catalyst capable of converting ethylene gas into carbon dioxide and water is selected from the group consisting of titanium iso-propoxide, titanium dioxide, zinc oxide, metal doped titania non-metal doped titania and combinations thereof.

In accordance with one embodiment of the present disclosure the photo-catalyst is embedded on the adsorbent substrate. The adsorbent substrate is selected from the group consisting of zeolite, Ag exchange ZSM 5 zeolite Zeolite A, alumina, silica and combinations thereof.

The adsorbent substrate is characterized as nano-scaled porous structure having particle size in the range of 0.1 nm to 150 nm. The porous structure and the nano size of the adsorbent substrate increases the surface area for adsorption of ethylene gas released by plant produce. The adsorbed ethylene gas is then converted into carbon dioxide and water by the photo-catalyst embedded adsorbent.

In accordance with one of the exemplary embodiments of the present disclosure the photo-catalyst is titanium iso-propoxide.

In accordance with another exemplary embodiment of the present disclosure the fiber comprises titanium iso-propoxide embedded on Ag exchanged ZSM 5 zeolite as a photo-catalyst. The presence of silver (Ag) in the ZSM 5 zeolite imparts additional antimicrobial property to the packaging prepared using the fiber of the present disclosure.

In accordance with one of the embodiments of the present disclosure the surface modifying agent is potassium persulphate and the photo-catalyst is covalently bonded to the fiber by means of at least one functional group generated by the treatment of potassium persulphate and the silicon containing linker.

In accordance with another embodiment of the present disclosure the surface modifying agent is sodium hydroxide and the photo-catalyst is covalently bonded to the fiber by means of the functional group generated by the treatment of sodium hydroxide and the silicon containing linker In accordance with another aspect of the present disclosure there is provided a process for preparing a fiber suitable for packaging. The process includes the following steps:

In the first step, the fiber is functionalized by contacting it with at least one surface modifying agent at a temperature of 30° C. to 100° C., for a time period of 15 min. to 5 hrs. and further washed and dried to obtain a functionalized fiber.

The fiber can be natural fiber of plant material selected from the group consisting of cotton, jute and cellulosic material; or the fiber can be synthetic fiber of polymeric material.

In accordance with one of the exemplary embodiment of the present disclosure the fiber is polyester fiber.

In the second step, the functionalized fiber is refluxed with a mixture comprising a photocatalyst, at least one solvent and optionally, a silicon containing linker at a temperature ranging between 40° C. and 90° C., and then washed, dried to obtain a fiber suitable for packaging. The proportion of silicon containing linker to the photocatalyst is in the range of 1:1 and 300:1.

The solvent includes methanol, ethanol, propanol, butanol and pentanol.

In accordance with one embodiment of the present disclosure the photo-catalyst is bonded to the surface of the fiber through at least one functional group of at least one surface modifying agent.

In accordance with another embodiment of the present disclosure the photo-catalyst is bonded to the surface of the fiber through at least one functional group of at least one surface modifying agent and silicon containing linker. The bond between the fiber and the photo-catalyst can be at least on bond from the group consisting of covalent, ionic, polar covalent, electrovalent, hydrogen, zwitterion, electron-pair, co-ordinate covalent, van der waals forces, cation pi interaction and ion pi interaction. The surface modifying agent may be at least one selected from the group consisting of lithium hydroxide (LiOH), sodium hydroxide (NaOH), potassium hydroxide (KOH), rubidium hydroxide (RbOH), cesium hydroxide (CsOH), potassium persulphate ($K_2S_2O_8$) and sodium persulphate ($Na_2S_2O_8$).

The photocatalyst used in the present disclosure is selected from the group consisting of titanium iso-propoxide, titanium dioxide, zinc oxide, metal doped titania and non-metal doped titania.

The metal doped titania can comprise at least one metal selected from the group consisting bismuth, cerium, lanthanum, iron, and zinc.

The non-metal doped titania can be nitrogen and sulfur doped titania.

In accordance with the present disclosure the photocatalyst embedded on the adsorbent substrate is obtained by a method which includes the following steps:

In the first step, the adsorbent substrate is treated with a mixture comprising at least one vehicle and at least one photocatalyst under stirring for a time period of 30 min to 5 hrs to obtain slurry. The proportion of the adsorbent to the mixture ranges between 5:1 and 50:1.

The vehicle can include methanol, ethanol, propanol and butanol.

In the second step, the slurry is dried at a temperature of 50° C. to 200° C. for a time period of 30 min to 5 hrs. to obtain an un-hydrolyzed photocatalyst embedded adsorbent substrate.

In the third step, the un-hydrolyzed photocatalyst embedded adsorbent is hydrolyzed with water to obtain a hydrolyzed photocatalyst embedded on the adsorbent substrate.

In the fourth step, the hydrolyzed photocatalyst embedded adsorbent is washed, dried and calcined to obtain a photo-catalyst embedded on the adsorbent substrate.

The adsorbents may be selected the group consisting of Ag exchanged ZSM 5 zeolite, zeolite A, alumina, silica and combinations thereof. The adsorbents are characterized as nano-scaled porous structures having particle size in the range of 0.1 nm to 150 nm.

The fiber of the present disclosure has its extensive end use application in preparing a packaging material for storage of plant produce.

Hereinafter, the present disclosure will be described in more detail with reference to the following examples, but the scope of the present disclosure is not limited thereto.

EXAMPLE 1

Preparation of Polyester Fabric (PSF) Treated with Photo-Catalyst Embedded Adsorbent and Alkali. (TZ-Alkali-PSF)

Step I: Preparation of Adsorbent Substrate:

A molar gel composition containing $SiO_2:Al_2O_3:Na_2O$: TEBA (triethylbutyl ammonium bromide):EDA (ethylene diamine):$H_2O$, in the proportion of 200:1:55.6 :3.13:3.13: 4227 respectively, was prepared by mixing all the above mentioned ingredient at their specified ratio. The molar gel was then aged at a temperature of 110° C. for 17 hrs. to obtain an aged molar gel composition. The aged molar gel composition was maintained in static mode under hydrothermal conditions at a temperature of 170° C. to obtain a solid mass. The solid mass was then washed and dried at a temperature of 120° C. for a time period of 6 hrs. in an oven and finally calcined at a temperature of 550° C. using air flow for a time period of 6 hrs. to obtain NaZSM-5 zeolite. The NaZSM-5 zeolite so obtained was treated with 1% aqueous silver nitrate ($AgNO_3$) solution at a proportion of 1:80 and at a temperature of 80° C. for a time period of 4 hrs. to obtain a dispersion containing crude adsorbent substrate. The crude adsorbent was filtered and then washed with distilled water and dried at 90° C. for 8 hrs. to obtain 17 gm of adsorbent substrate (Ag-ZSM-5 zeolite).

Step II: Preparation of Photo-catalyst Embedded Adsorbent:

3.5 mL of 2-propanol was mixed with 0.7 ml of titanium (IV) isopropoxide and stirred for a time period of 30 min to obtain a slurry. A mixture containing 7 g of Ag-exchanged zeolite (Ag-ZSM-5 zeolite) and 10 ml of 2-propanol was then added to the slurry under stirring for 2 hrs. The excess of propanol was then removed to obtain a photo-catalyst embedded adsorbent having an un-hydrolyzed catalyst. The photo-catalyst embedded adsorbent so obtained was dried at a temperature of 120° C. for 3 hrs and further treated with water to hydrolyze titanium (IV) isopropoxide, subsequently, dried in an oven at 100° C. for 16 hrs. and then calcined at a temperature of 450° C. for 6 hrs. to obtain 7.5 gm of photo-catalyst embedded adsorbent.

Step III: Functionalization of Polyester Fabric (PSF)

20 g PSF woven fabric was treated with a warm solution of 10% NaOH (maintained at a temperature of 50 to 60° C.) for a period of 5 min and then washed with distilled water and dried at a temperature of 70° C. for 30 min in an oven to obtain a functionalized polyester fabric (PSF). The proportion of fabric to alkali solution is 1:25.

Step IV: Immobilization of the Photo-Catalyst Embedded Adsorbent on the Surface of the Functionalized Polyester Fabric (PSF)

The functionalized PSF was refluxed with a mixture containing 20% tetraethyl orthosilicate, ethanol and photo-catalyst embedded catalyst at a temperature of 70° C. for a period of 40-45 min to obtain a treated fabric (PSF). The treated PSF was then rolled to remove excess of adsorbed material and dried at 70° C. for 1 hr. in an oven to obtain a TZ-Alkali-PSF.

Figure 1:
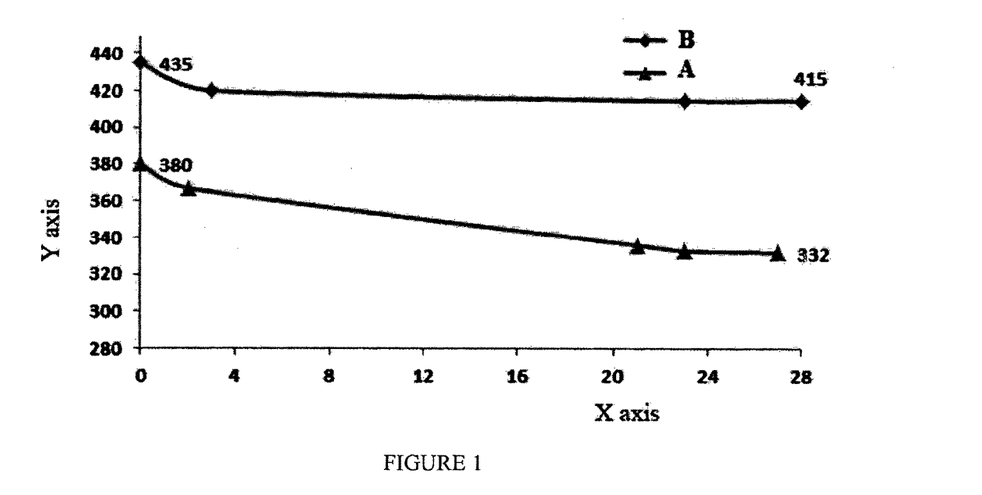
FIG. 1: illustrates the ethylene adsorption capacity of the fiber of the present disclosure, in which A represents ethylene adsorption capacity of TZ-Alkali-PSF, B represents ethylene adsorption capacity of the control PSF (polyester staple fabric without photocatalyst), X-axis represents time in hrs. and the Y-axis represents concentration of ethylene in parts per million (ppm).

The TZ-Alkali-PSF so prepared was then evaluated for ethylene adsorption capacity using fluorescent lamp. In the evaluation process 1 g of TZ-Alkali-PSF was kept in an airtight round bottom glass flask maintained at a temperature of 40° C. and then known amount of ethylene (between 100 to 400 ppm) was introduced. The control PSF (polyester staple fabric without photocatalyst) was also evaluated under similar conditions. The reduction of the ethylene content was determined periodically by extracting 0.5 µL of gas through air tight gas syringe and analyzed by gas chromatograph. TZ-Alkali-PSF fabric removed 12.6% (48 ppm) of ethylene/gm of fabric after 27 hrs. whereas control PSF (polyester staple fabric without photocatalyst) removed 4.6% (20 ppm) of ethylene/gm of fabric (as shown in FIG. 1).

The TZ-Alkali-PSF was also evaluated for dust leaching. For this purpose, 100 g of TZ-Alkali-PSF was kept in a beaker with 200 gm of water and shaken occasionally. After 4 h, TZ-Alkali-PSF was taken out and water was filtered. Results showed that less than 0.01 wt % solid fines were leached in water.

EXAMPLE 2

The adsorbent substrate and the photocatalyst embedded adsorbent substrate were prepared in accordance with Step I and II of the Example 1 and then the following steps III and IV were followed.

Step III: Functionalization of polyester fabric (PSF)

10 g PSF woven fabric was treated with 5% $K_2S_2O_8$ (1600 mL) solution at a temperature of 85 to 90° C. and for a time period of 3 to 4 hrs. The $K_2S_2O_8$ treated fabric. so obtained was then washed with distilled water and dried at a temperature of 70° C. for 1 hr. in an oven to obtain a functionalized polyester fabric (PSF).

Step IV: Immobilization of the Photo-Catalyst Embedded Adsorbent on the Surface of the Functionalized Polyester Fabric (PSF)

5 g of the functionalized PSF was refluxed with a mixture comprising 50 g tetraethyl orthosilicate solution (20% TEOS solution in ethanol) and 0.5 g catalyst embedded adsorbent at a temperature of 70° C. for 40 to 45 min to obtain a treated fabric (PSF). The treated fabric (PSF) was rolled and dried at a temperature of 70° C. for 1 hr. in an oven. The PSF fabric so prepared was designated as TZ-KS-PSF.

Figure 2:
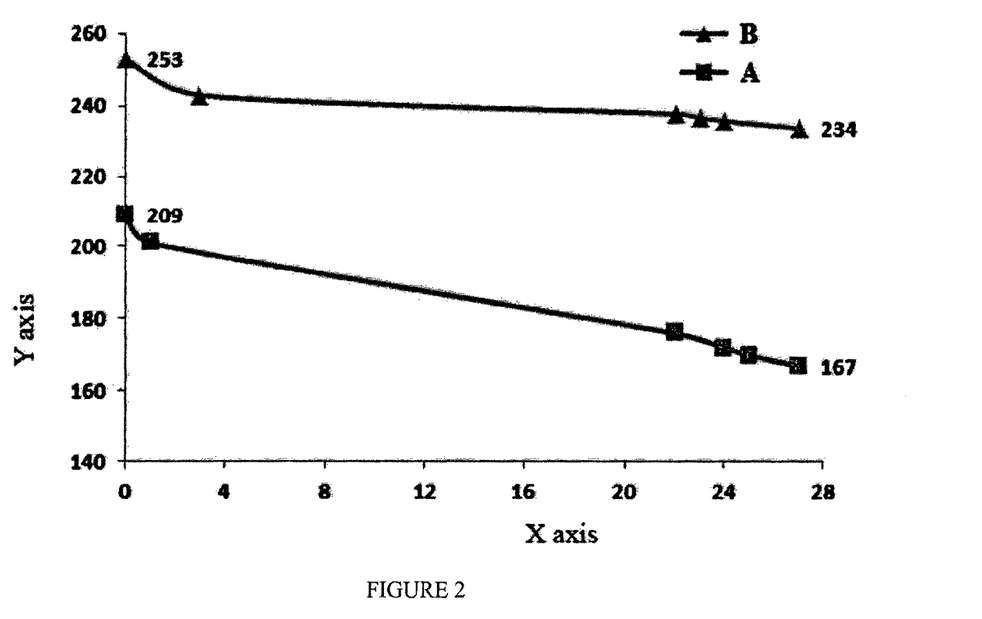
FIG. 2: illustrates the ethylene adsorption capacity of the fiber of the present disclosure, in which A represents ethylene adsorption capacity of TZ-KS-PSF, B represents ethylene adsorption capacity of the control PSF (polyester staple fabric without photocatalyst), X-axis represents time in hrs. and Y-axis represents concentration of ethylene in parts per million (ppm).

The TZ-KS-PSF was evaluated under similar conditions as described in example 1 and reduction of the ethylene content was determined periodically by extracting 0.5 µL of gas through air tight gas syringe and analyzed by gas chromatograph. TZ-KS-PSF fabric removed 20.0% (42 ppm) of ethylene/g of fabric after 27 h whereas control PSF (polyester staple fabric without photocatalyst) removed 7.5% (19 ppm) of ethylene/g (as shown in FIG. 2).

EXAMPLE 3

Titanium (IV) Isopropoxide Treated Polyester Fabric (T-KS-PSF)

Step I: Functionalization of Polyester Fabric (PSF)

5 g PSF woven fabric was treated with 800 mL of 5% $K_2S_2O_8$ solution at a temperature of 85 to 90° C. for 3-4 hr., then washed with distilled water and dried at a temperature of 70° C. for 1 hr. in oven to obtain a functionalized polyester fabric (PSF).

Step II: Immobilization of the Titanium (IV) Isopropoxide (Photo-catalyst) on the Surface of the Functionalized Polyester Fabric (PSF):

4.5 g of the functionalized woven PSF was refluxed with 45 g titanium (IV) isopropoxide solution (20% titanium (IV) isopropoxide solution in 2-propanol) at a temperature of 75-80° C. for 1 hr to obtain a treated PSF. The treated PSF fabric was rolled and oven dried at a temperature of 70° C. for 1 h. The PSF fabric so prepared was referred as T-KS-PSF.

Figure 3:
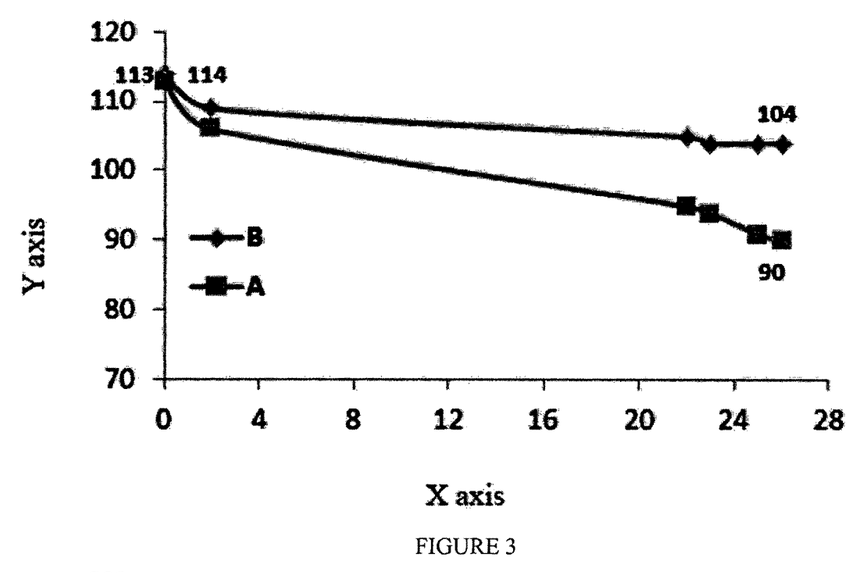
FIG. 3: illustrates the ethylene adsorption capacity of the fiber of the present disclosure, in which A represents ethylene adsorption capacity of T-KS-PSF, B represents ethylene adsorption capacity of the control PSF (polyester staple fabric without photocatalyst), X-axis represents time in hrs. and Y-axis represents concentration of ethylene in parts per million (ppm).
Figure 4:
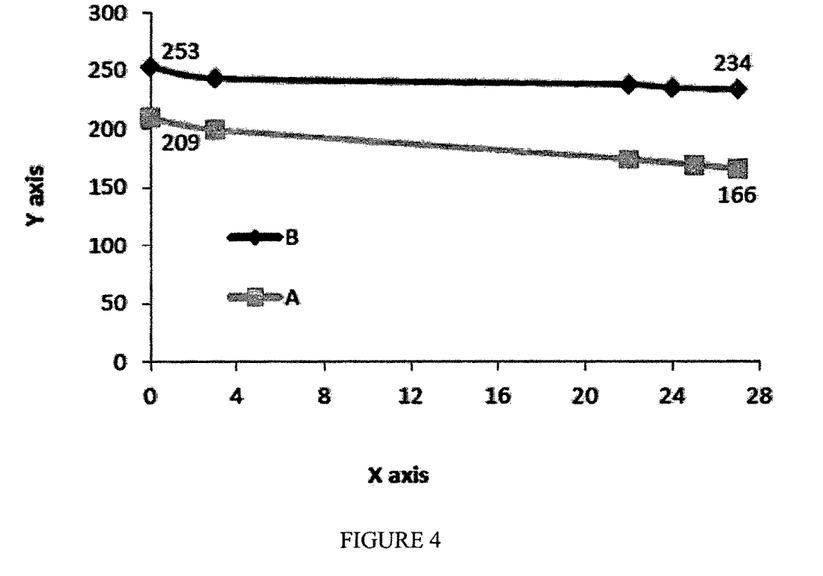
FIG. 4: illustrates the ethylene adsorption capacity of the fiber of the present disclosure, in which A represents ethylene adsorption capacity of Bi-KS-PSF, B represents ethylene adsorption capacity of the control PSF (polyester staple fabric without photocatalyst), X-axis represents time in hrs. and Y-axis represents concentration of ethylene in parts per million (ppm).
Figure 5:
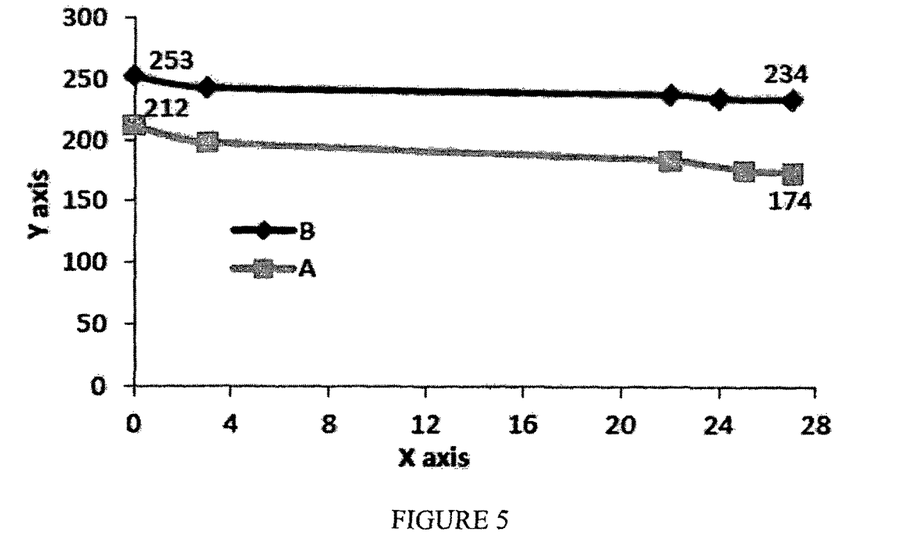
FIG. 5: illustrates the ethylene adsorption capacity of the fiber of the present disclosure, in which A represents ethylene adsorption capacity of La-KS-P SF, B represents ethylene adsorption capacity of the control PSF (polyester staple fabric without photocatalyst), X-axis represents time in hrs. and Y-axis represents. concentration of ethylene in parts per million (ppm).
Figure 6:
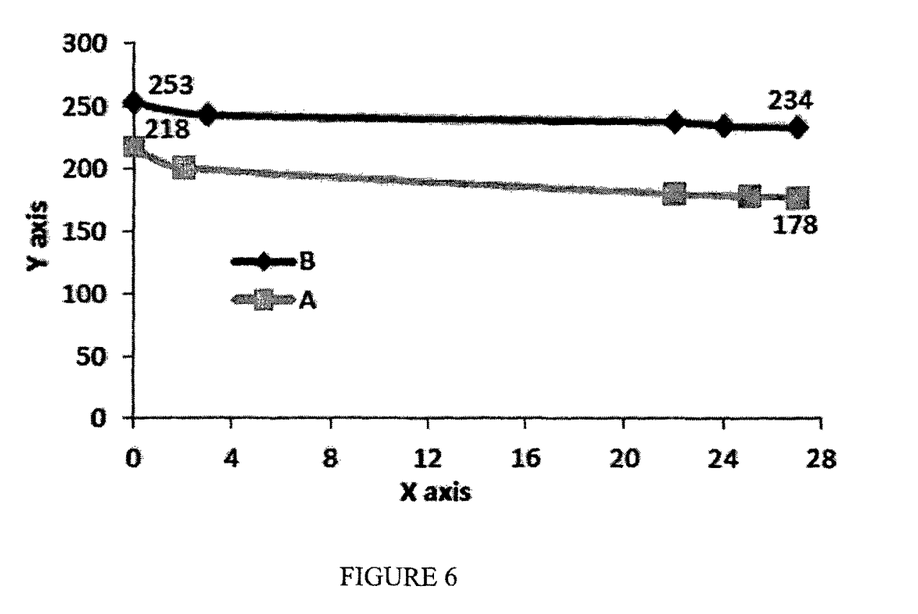
FIG. 6: illustrates the ethylene adsorption capacity of the fiber of the present disclosure, in which A represents ethylene adsorption capacity of Zn-KS-PSF, B represents ethylene adsorption capacity of the control PSF (polyester staple fabric without photocatalyst), X-axis represents time in hrs. and Y-axis represents concentration of ethylene in parts per million (ppm).
Figure 7:
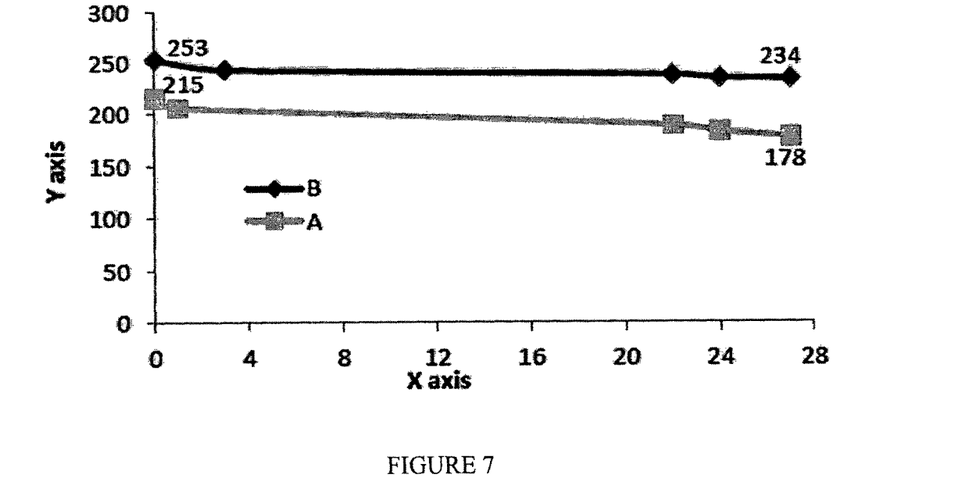
FIG. 7: illustrates the ethylene adsorption capacity of the fiber of the present disclosure, in which A represents ethylene adsorption capacity of Ce-KS-PSF, B represents ethylene adsorption capacity of the control PSF (polyester staple fabric without photocatalyst), X-axis represents time in hrs. and Y-axis represents concentration of ethylene in parts per million (ppm).
Figure 8:
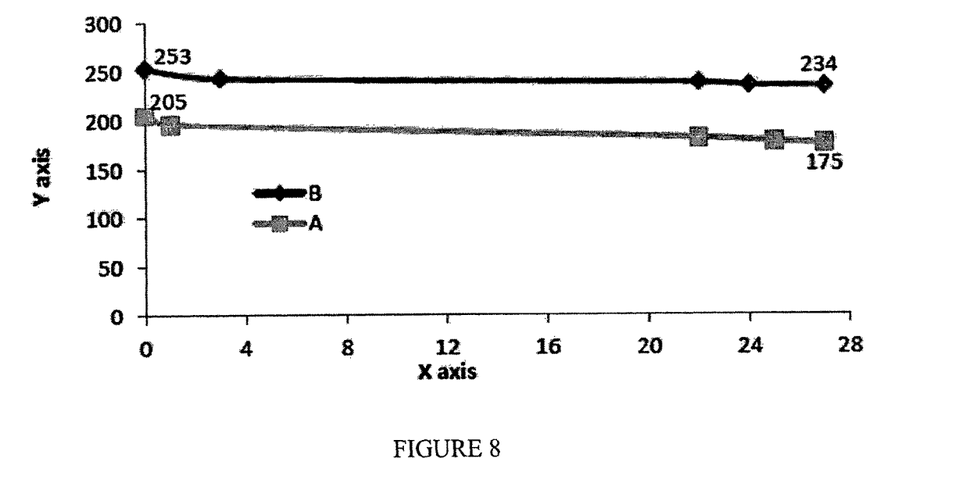
FIG. 8: illustrates the ethylene adsorption capacity of the fiber of the present disclosure, in which A represents ethylene adsorption capacity of Fe-KS-PSF, B represents ethylene adsorption capacity of the control PSF (polyester staple fabric without photocatalyst), X-axis represents time in hrs. and Y-axis represents concentration of ethylene in parts per million (ppm).
Figure 9:
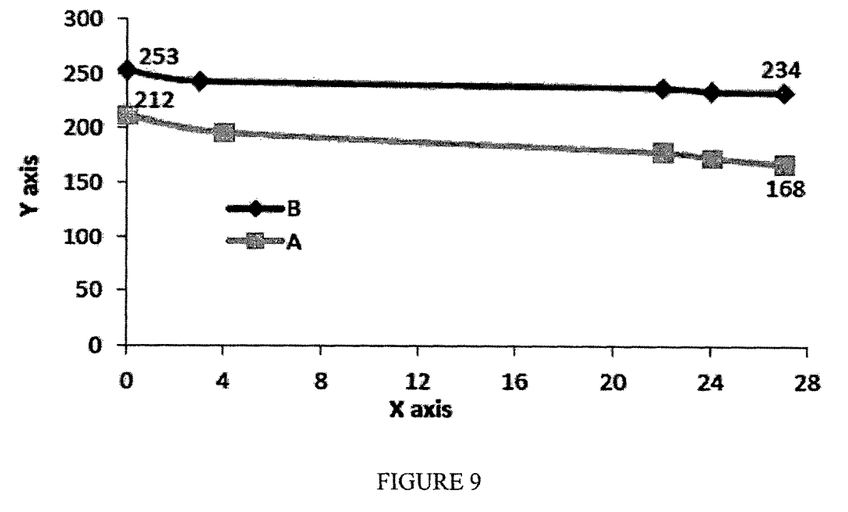
FIG. 9: illustrates the ethylene adsorption capacity of the fiber of the present disclosure, in which A represents ethylene adsorption capacity of N-KS-PSF, B represents ethylene adsorption capacity of the control PSF (polyester staple fabric without photocatalyst), X-axis represents time in hrs. and Y-axis represents concentration of ethylene in ppm (parts per million).
Figure 10:
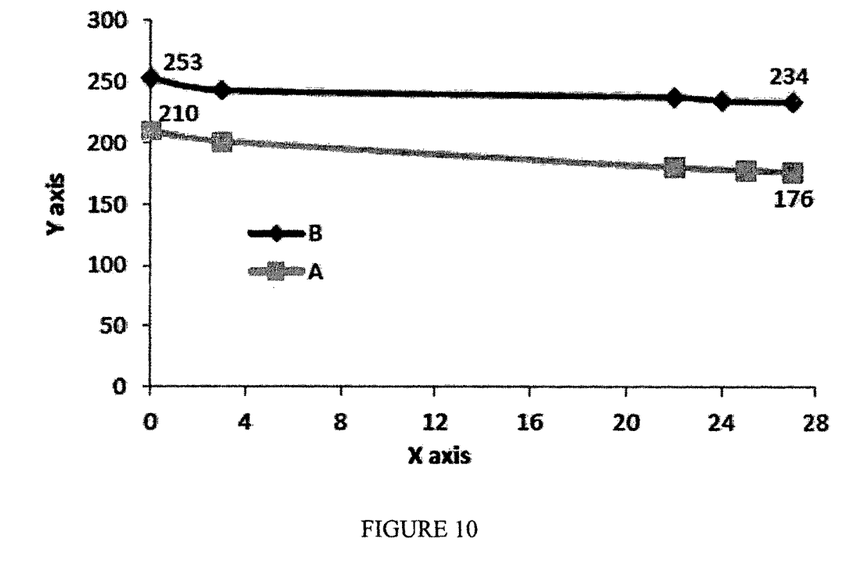
FIG. 10: illustrates the ethylene adsorption capacity of the fiber of the present disclosure, in which A represents ethylene adsorption capacity of S-KS-PSF, B. represents ethylene adsorption capacity of the control PSF (polyester staple fabric without photocatalyst), X-axis represents time in hrs. and Y-axis represents concentration of ethylene in ppm (parts per million).

The T-KS-PSF was evaluated under similar conditions as described in example 1 and reduction of the ethylene content was determined periodically by extracting 0.5 μL of gas through air tight gas syringe and analyzed by gas chromatograph. T-KS-PSF removed 20.4% of (23 ppm) of ethylene/g of fabric after 27 h whereas control PSF (polyester staple fabric without photocatalyst) removed 8.8% (10 ppm) of ethylene/g of PSF after 27 h as shown in FIG. 3.

EXAMPLE 4

Metal or Non-Metal Doped Photo-Catalyst Immobilized on $K_2S_2O_8$ Hydrolyzed Polyester Fabric Bismuth ($Bi^{3+}$), lanthanum ($La^{3+}$), zinc ($Zn^{2+}$), cerium ($Ce^{4+}$), iron ($Fe^{2+}$ and $Fe^{3+}$), sulfur and nitrogen doped photocatalyst embedded adsorbent were prepared as mentioned in example 1 (Step I and II) and immobilized on the surface of $K_2S_2O_8$ treated woven PSF as described in example 2 (Step IV) to obtain doped fabrics namely, Bi-KS-PSF, La-KS-PSF, Zn-KS-PSF Ce-KS-PSF Fe-KS-PSF, S-KS-PS and N-KS-PSF. These doped fabrics were evaluated under similar conditions as described in example 1 and it was observed that these doped fabrics removed 14 to 22% (29-46 ppm) of ethylene/gm of fabric after 27 hrs. whereas control PSF (polyester staple fabric without photocatalyst) removed 7.5% (19 ppm) of ethylene/gm of fabric (shown in FIGS. 4 to 10)

EXAMPLE 5

Immobilization of ZnO Based Photocatalyst Embedded Adsorbent on $K_2S_2O_8$ Hydrolyzed Polyester Fabric In-situ incorporation of zinc oxide (ZnO) catalyst into Ag-ZSM-5 zeolite powder (adsorbent substrate) was done by mixing aqueous solutions of zinc nitrate (1 g) and previously prepared Ag-exchanged zeolite (10 g) under stirring for 2 hrs. followed by evaporation of water and calcination at a temperature of 500° C. Thus prepared photocatalyst embedded adsorbent was immobilized on the surface of $K_2S_2O_8$ treated woven PSF as described in example 1 to obtain a ZnO-KS-PSF.

Figure 11:
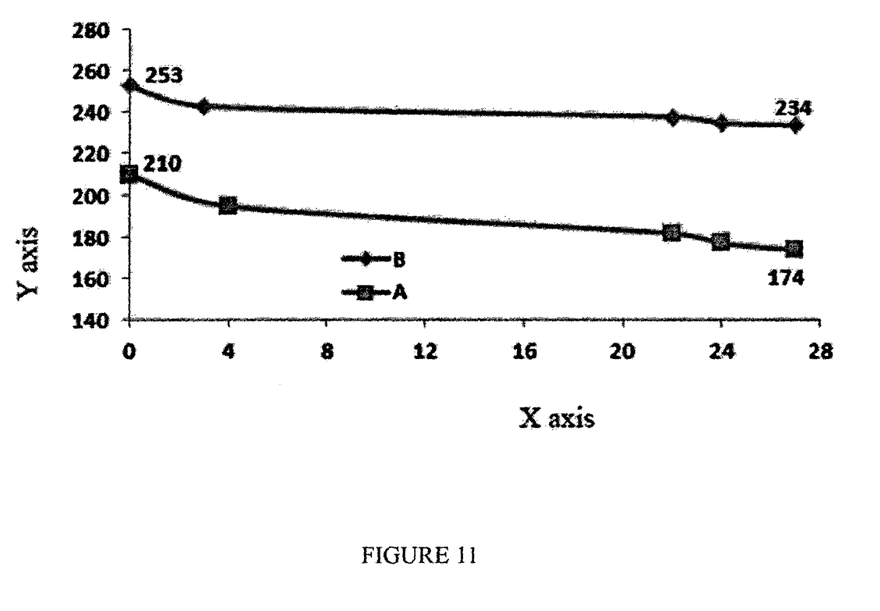
FIG. 11: illustrates the ethylene adsorption capacity of the fiber of the present disclosure, in which A represents ethylene adsorption capacity of ZnO-KS-PSF, B represents ethylene adsorption capacity of the control PSF (polyester staple fabric without photocatalyst), X-axis represents time in hrs. and Y-axis represents concentration of ethylene in parts per million (ppm).

The ZnO-KS-PSF was evaluated under similar conditions as described in example 1 and reduction of the ethylene content was determined periodically by extracting 0.5 μL of gas through air tight gas syringe and analyzed by gas chromatograph. The Zn-KS-PSF removed 17.1% (36 ppm) of ethylene/g of fabric after 27 hrs. whereas control PSF (polyester staple fabric without photocatalyst) removed 7.5% (19 ppm) of ethylene/g of fabric as shown in FIG. 11.

Tomatoes Efficacy Test:

The ethylene adsorption capacity of TZ-Alkali-PSF and TZ-KS-PSF fabric was compared with control PSF (polyester staple fabric without photocatalyst) using the Tomatoes efficacy test. In this study 500 g of tomatoes showing 30-40% of total surface developing ripeness with yellowish or pinkish color were stored separately in sealed containers of TZ-Alkali-PSF, TZ-KS-PSF and control PSF (polyester staple fabric without photocatalyst). The containers were kept at a temperature of 25° C. and 80% relative humidity under fluorescent lamp. The evolution of the ethylene content in the sealed containers was determined periodically by extracting 1 ml of ethylene gas through a Hamilton make air tight gas syringe through airtight septum fixed on container and analyzed by gas chromatograph. Ethylene content of the sealed container was reduced to <1 ppm for TZ-Alkali-PSF and TZ-KS-PSF after 28 days and 24 days, respectively. Tomatoes remained fresh for 32 and 38 days as analyzed visually. It was also observed that the tomatoes kept in a container of control PSF (polyester staple fabric without photocatalyst) remained fresh for 1 week and the ethylene concentration was in the range of 7 to 8 ppm. These tomatoes were visibly softer, wrinkled with weight loss and fungal spots.

Tomatoes kept in containers of TZ-Alkali-PSF and TZ-KS-PSF showed only <2% weight loss, while control PSF (polyester staple fabric without photocatalyst) showed >70% weight loss.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "a", "at least" or "at least one" suggests the use of one or more elements or ingredients or quantities, as the use may be in the embodiment of the disclosure to achieve one or more of the desired objects or results.

The numerical values given for various physical parameters, dimensions and quantities are only approximate values and it is envisaged that the values higher or lower than the numerical value assigned to the physical parameters, dimensions and quantities fall within the scope of the disclosure and the claims unless there is a statement in the specification to the contrary.

While certain embodiments of the disclosure have been described, these embodiments have been presented by way of examples only, and are not intended to limit the scope of the disclosure. Variations or modifications in the process of this disclosure, within the scope of the disclosure, may occur to those skilled in the art upon reviewing the disclosure herein. Such variations or modifications are well within the spirit of this disclosure.

The invention claimed is:

1. A fiber suitable for packaging; said fiber comprising a photocatalyst bonded to it by means of a first functional group generated by a surface modifying agent; and optionally, a second functional group generated by a silicon containing linker, wherein the photocatalyst is at least one selected from the group consisting of titanium iso-propoxide, zinc oxide, metal doped titania and non-metal doped titania, wherein the photo-catalyst is embedded in at least one adsorbent substrate, and wherein the particle size of the at least one adsorbent substrate ranges between of 0.1 nm and 150 nm.

2. The fiber as claimed in claim 1, wherein the fiber is natural fiber of plant material selected from the group consisting of cotton, jute and cellulosic material; or the fiber is synthetic fiber of polymeric material.

3. The fiber as claimed in claim 1, wherein the fiber is polyester fiber.

4. The fiber as claimed in claim 1, wherein the metal doped titania comprises at least one metal selected from the group consisting bismuth, cerium, lanthanum, iron and zinc; and the non-metal doped titania comprises at least one non-metal selected from the group consisting of nitrogen and sulfur.

5. The fiber as claimed in claim 1, wherein the adsorbent substrate is at least one selected from the group consisting of Ag exchanged ZSM 5 zeolite, zeolite A, alumina and silica.

6. The fiber as claimed in claim 1, wherein the surface modifying agent is at least one selected from the group consisting of lithium hydroxide (LiOH), sodium hydroxide (NaOH), potassium hydroxide (KOH), rubidium hydroxide (RbOH), cesium hydroxide (CsOH), potassium persulphate ($K_2S_2O_8$) and sodium persulphate ($Na_2S_2O_8$).

7. The fiber as claimed in claim 1, wherein the bond between the fiber and the photo-catalyst is at least one bond from the group consisting of covalent, ionic, hydrogen, zwitterion, electron-pair, van der waals forces and pi bond interaction.

8. The fiber as claimed in claim 1, wherein the silicon containing linker is at least one selected from the group consisting of tetramethyl ortho silicate, trimethoxy silane, tetraethyl orthosilicate, triethoxy silane, methyl-dimethoxy silane, methyl-diethoxy silane, methyl-trimethoxy silane, cyclohexyl triethoxy silane, methyl-triethoxy silane, methyl-tripropoxy silane, methyl-tributoxysilane, propyl-trimethoxy silane, propyl-triethoxy silane, allyl-triethoxy silane, n-butyl trimethoxy silane, n-butyl triethoxy silane, i-butyl-trimethoxy silane, i-butyl-triethoxy silane, dodecyl-trimethoxy silane.

9. A process for preparing the fiber suitable for packaging as claimed in claim 1, said process comprising the following steps:

a. contacting a fiber with at least one surface modifying agent at a temperature of 30° C. to 100° C., for a time period of 15 min. to 5 hrs. followed by washing and drying to obtain a functionalized fiber; and b. refluxing the functionalized fiber with a mixture comprising the photocatalyst, at least one solvent and optionally, a silicon containing linker at a temperature ranging between 40° C. and 90° C., followed by washing, and drying to obtain the fiber suitable for packaging.

10. The process as claimed in claim 9, wherein the fiber is natural fiber of plant material selected from the group consisting of cotton, jute and cellulosic material; or the fiber is synthetic fiber of polymeric material.

11. The process as claimed in claim 9, wherein the fiber is polyester fiber.

12. The process as claimed in claim 9, wherein the surface modifying agent is at least one selected from the group consisting of lithium hydroxide (LiOH), sodium hydroxide (NaOH), potassium hydroxide (KOH), rubidium hydroxide (RbOH), cesium hydroxide (CsOH), potassium persulphate ($K_2S_2O_8$) and sodium persulphate ($Na_2S_2O_8$).

13. The process as claimed in claim 9, wherein the proportion of silicon containing linker to the photocatalyst is in the range of 1:1 and 300:1.

14. The process as claimed in claim 9, wherein the metal doped titania comprises at least one metal selected from the group consisting bismuth, cerium, lanthanum, iron and zinc; and the non-metal doped titania comprises at least one non-metal selected from the group consisting of nitrogen and sulfur.

15. The process as claimed in claim 9, wherein the photo-catalyst is embedded in adsorbent substrate and said photocatalyst is obtained by a method comprising the following steps:

i. treating at least one adsorbent substrate with a mixture comprising at least one vehicle and at least one photocatalyst under stirring for a time period of 30 min to 5 hrs to obtain slurry; wherein, the proportion of the adsorbent substrate to the mixture is in the range of 5:1 to 50:1 ii. drying the slurry at a temperature of 50° C. to 200° C. for a time period of 30 min to 5 hrs. to obtain an un-hydrolyzed photocatalyst embedded in adsorbent substrate;

iii. hydrolyzing the un-hydrolyzed photocatalyst embedded in adsorbent substrate with water to obtain a hydrolyzed photocatalyst embedded in adsorbent substrate; and iv. drying and calcining the hydrolyzed photocatalyst embedded in adsorbent substrate to obtain a photocatalyst embedded in adsorbent substrate.

16. The process as claimed in claim 15, wherein the metal doped titania comprises at least one metal selected from the group consisting bismuth, cerium, lanthanum, iron and zinc; and the non-metal doped titania comprises at least one non-metal selected from the group consisting of nitrogen and sulfur.

17. The process as claimed in claim 15, wherein the adsorbent substrate is at least one selected from the group consisting of Ag exchanged ZSM 5 zeolite, zeolite A, alumina and silica; and wherein the particle size of the adsorbent substrate ranges between of 0.1 nm and 150 nm.

18. A packaging material prepared using the fiber as claimed in claim 1.

* * * * *